United States Patent [19]

Ochsner

[11] Patent Number: 4,706,967
[45] Date of Patent: Nov. 17, 1987

[54] VALVE GUIDE SEAL DEVICE

[75] Inventor: Hans W. Ochsner, Metamora, Mich.

[73] Assignee: General Motors Corporation, Detroit, Mich.

[21] Appl. No.: 30,842

[22] Filed: Mar. 27, 1987

[51] Int. Cl.⁴ .......................... F16J 15/56; F01L 3/08
[52] U.S. Cl. ...................................... 277/33; 277/178; 123/188 P; 123/188 GC
[58] Field of Search .......................... 277/12, 33, 178; 123/90.65, 90.66, 90.67, 188 P, 188 GC, 188 SA, 188 SB, 188 SC

[56] References Cited

U.S. PATENT DOCUMENTS

| | | | |
|---|---|---|---|
| 2,418,674 | 4/1947 | Steiner | 123/188 P |
| 3,369,819 | 2/1968 | Soo | 277/33 X |
| 3,372,941 | 3/1968 | Liebig | 277/33 X |
| 3,492,982 | 2/1970 | Norris | 277/33 X |

FOREIGN PATENT DOCUMENTS

| | | | |
|---|---|---|---|
| 667091 | 7/1963 | Canada | 277/33 |
| 1141209 | 3/1957 | France | 123/188 GC |
| 638584 | 4/1962 | Italy | 123/188 GC |

Primary Examiner—Robert S. Ward
Attorney, Agent, or Firm—Arthur N. Krein

[57] ABSTRACT

A valve guide seal device for the stem of a valve used in an internal combustion engine includes a seal/scraper ring retainer having an upper enlarged diameter portion supporting a scraper ring adapted to be fixed in the counterbore of a stepped valve guide bore in the cylinder head of the engine and a lower tube portion extension that projects into a fluid passage in the cylinder head, flow through which is controlled by a poppet valve that has a nominal diameter valve stem portion slidably received in the valve guide bore and in the scraper ring, and a valve stem portion with an upstanding annular bead that is slidably received in the lower tube portion extension when the valve is in its valve closed position to define therewith a gas flow barrier and which is adapted to scrape out any carbon deposits or the burnt ash therefrom during opening movement of the valve.

2 Claims, 3 Drawing Figures

VALVE GUIDE SEAL DEVICE

FIELD OF THE INVENTION

This invention relates to valve guides in internal combustion engines and, in particular, to a valve guide seal device.

DESCRIPTION OF THE PRIOR ART

The desirability of preventing the build up of carbon deposits on the stems of poppet valves and, in particular, on the exhaust valves, in an internal combustion engine has long been recognized since such deposits can cause more rapid wear and damage to the valve stem and its associate valve guide in the cylinder head of the engine.

To this end there has been proposed various solutions for this problem as disclosed, for example, in U.S. Pat. No. 1,470,276 entitled "Packing Device for Valve Stems" issued Oct. 9, 1923 to Albert C. Lindbloom or U.S. Pat. No. 2,360,606 entitled "Valve Guide Scraper Ring" issued Oct. 17, 1944 to Robert F. Huddleston and in French Pat. No. 1,021,812 to M. Federico Sinisteria published on Feb. 24, 1953. However, it does not appear that any of the devices disclosed in the above-identified patents are in present day use in any known internal combustion engines.

SUMMARY OF THE INVENTION

The present invention relates to a valve guide seal device that includes a scraper ring in the form of a washer that encircles the stem of a poppet valve and which is supported in a seal/scraper ring retainer secured in the counterbored stepped valve stem guide bore at the inboard end of the cylinder head of an engine, the seal/scraper ring retainer including a reduced diameter tubular portion of a predetermined internal diameter to slidably receive an upstanding annular bead provided on the stem of a poppet valve next adjacent to the head of the poppet valve such that when the poppet valve is in a valve closed position, the head is slidably received in the tubular portion to restrict, for example, exhaust gas flow toward the seal ring and when the poppet valve is in a valve open position, the head is located outboard of the tubular portion to allow carbon deposits scraped off of the stem by the seal ring or by the bead on the valve stem to fall out of the seal ring container so that these scraped off carbon deposits can be burned off or the ashes thereof can be blown away from the seal area by the fluid flow that occurs when the poppet valve is being moved to its full valve open position.

It is therefore a primary object of this invention to provide an improved valve guide seal device especially for use with an exhaust valve, the valve guide seal device including a valve stem scraper ring operatively supported in a tubular seal/scraper ring retainer fixed in the cylinder head of an engine at the inboard end of a valve stem guide therein, with the associate poppet valve having an upstanding annular bead on its stem at a location such that when the poppet valve is in a valve closed position the annular bead is slidably received within a portion of the tubular seal/scraper ring retainer to substantially block exhaust flow toward the scraper ring.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
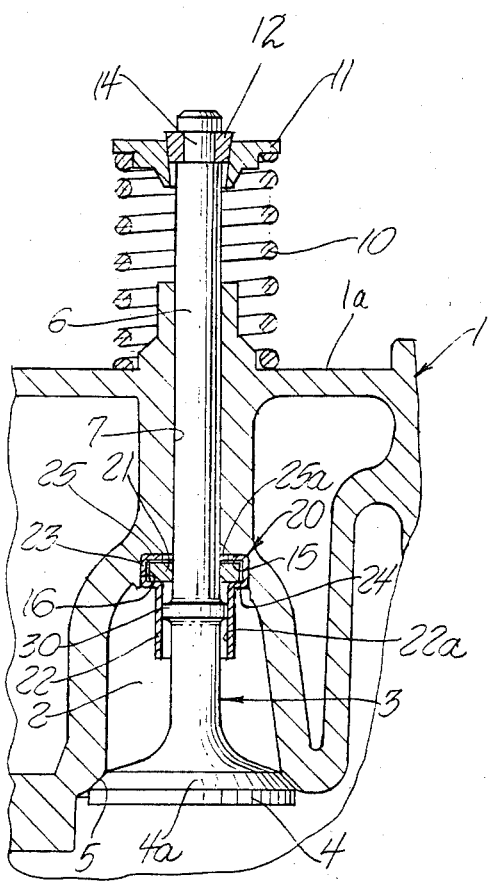
FIG. 1 is a cross-sectional view through a portion of an internal combustion engine illustrating a valve assembly with a valve guide seal device in accordance with the invention incorporated therein, the valve being shown in its valve closed position.
Figure 2:
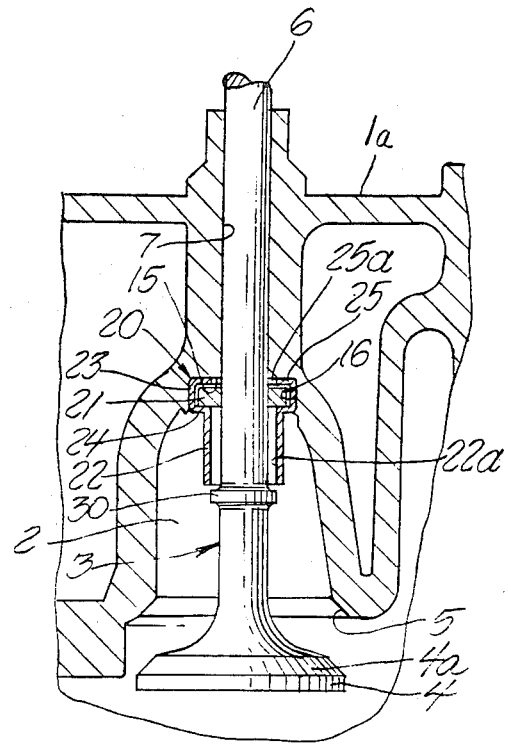
FIG. 2 is a view showing only a portion of the valve assembly of FIG. 1 but with the valve being shown in its valve open position; and, FIG. 3 is an enlarged cross-sectional view of the scraper ring and seal/scraper ring retainer, per se, of the valve guide seal device shown in FIGS. 1 and 2.

Referring first to FIGS. 1 and 2, there is shown a portion of a cylinder head 1 for an internal combustion engine, the cylinder head 1 having a passage 2 therein, which for the purpose of describing the preferred use of the valve guide seal device of the invention will be referred to as an exhaust passage 2.

Flow through the exhaust passage 2 from a combustion chamber, not shown, is controlled by a valve 3. The valve 3 is a poppet valve with a head 4 which is adapted to seat or close against a valve seat 5 encircling the port end of the exhaust passage 2 in the cylinder head 1, and the valve 3 has a valve stem 6 extending from the head 4. As conventional, a portion of the valve stem 6 is slidably supported in a valve stem guide bore 7 which may be formed in the cylinder head 1, as shown, or which may be provided by means of a separate valve guide, not shown, which is positioned in the cylinder head 1 in a manner well known in the art.

As conventional and as shown in FIG. 1, the valve 3 is normally biased to a valve closed position seated against the valve seat 5 by a valve return spring 10 which abuts at one end against the upper surface 12 of the cylinder head 1, while its opposite end abuts against a spring retainer 11 that is secured to the valve stem 6 by a conventional retainer lock 12 engaged in the conventional grooved 14 upper end of the valve stem 6.

Referring now to a feature of the invention the lower counterbored internal wall defining the counterbored stepped valve stem guide bore 7 at its lower or inboard end is connected by a flat shoulder 15 to a circular internal enlarged counterbored bore wall 16 that is formed concentric to the central axis of the nominal valve stem guide bore 7 and with a predetermined internal diameter greater than the internal diameter of the nominal valve stem guide bore 7.

As shown in FIGS. 1 and 2, the enlarged counterbored wall 16 is of a predetermined axial extent and at its lower end this bore wall 16 opens into the exhaust passage 2. Thus the valve stem guide bore 7 and the bore defining the bore wall 16 may be referred to as a counterbored stepped valve stem guide bore with the counterbore wall 16 being sized so as to receive the enlarged upper end of a seal/scraper ring retainer, generally designated 20, loosely supporting a scraper ring 21 therein.

Figure 3:
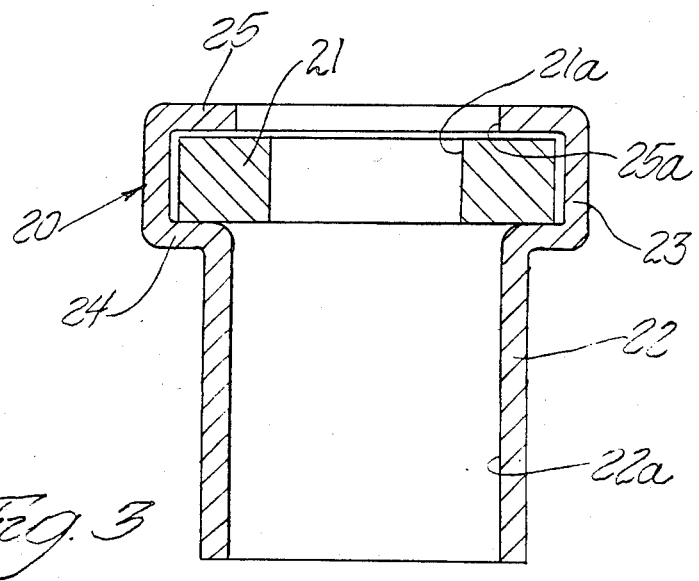

As shown, the seal/scraper ring retainer 20 which is of stepped tubular configuration and made of a suitable material, such as a corrosion resistant chromium, nickel, iron alloy, includes a lower tube portion 22 and an upper portion 23 of a larger external diameter than the tube portion 22 to which it is connected by a flat shoulder 24. Also in the construction shown, a free end portion of the upper portion 23, as originally formed, after insertion of the scraper ring 21 therein, is spun over radially inward to form a washer like flange 25 having a suitable sized enlarged opening 25a therethrough, whereby the scraper ring 21 can be loosely trapped between the shoulder 24 and flange 25 as best seen in FIG. 3.

As illustrated, the scraper ring 21 made of a suitable material which can be the same as that of the seal ring retainer, has a central opening 21a therethrough that is formed with an internal diameter so as to slidably receive the valve stem 6 of the poppet valve 3 in a manner such that it is operative to scrape off any carbon deposits that may be deposited on the valve stem 6 during engine operation. In addition, the thickness or axial extent of the scraper ring 21 is selected so that the internal wall defining the opening 21a provides a sufficient bearing surface to prevent tilting of the scraper ring 21 relative to the valve stem 6. Also, as best seen in FIG. 3, the outside diameter of the scraper ring 21 is suitably less than the internal diameter of the straight walled upper portion 23 so that the scraper ring 21 is self centering relative to the valve stem 6. Also the opposed surfaces of the scraper ring 21 are flat as are the shoulder 25 and inner surface of flange 25 so that when the scraper ring 21 seats against one of these surfaces it will act, in effect, as a valve.

In the construction shown, the external diameter of the upper portion 23 is selected so that the seal/scraper ring retainer 20 can be suitably secured and thus fixed in the bore wall 16, as by a press fit, whereby the seal/scraper ring retainer 20 is fixed to the cylinder head 1 in a position such that its lower portion 22 extends a predetermined axial extent into the exhaust passage 2 and is positioned concentrically of the reciprocating axis of the poppet valve 3 and thus also with respect to the axis of the valve stem guide bore 7.

Referring now again to the poppet valve 3, in accordance with another feature of the invention, the valve stem 6 of this valve is provided with an upstanding annular bead 30 which may be formed as an integral part of the valve stem 6, as shown, or it may be formed as a separate ring like element that is suitably fixed to the valve stem 6 as, for example, by brazing or welding as well known in the art.

The external diameter of the annular bead 30 and the internal diameter of the internal wall 22a of the tube portion 22 of the seal/scraper ring retainer 20 are preselected relative to each other so that the annular bead 30 is substantially sealingly and slidably received in the inner wall 22a of the tube portion 22.

As best seen in FIGS. 1 and 2, the annular bead 30 is located on the valve stem 6 a predetermined axial extent from the seating surface 4a of the valve head 4 so that when the poppet valve 3 is in its valve closed position as shown in FIG. 1, the annular bead 30 is axially positioned within the lower tube portion 22 of the seal ring retainer 20 and when the poppet valve 3 is in a full open position, as shown in FIG. 2, the annular bead 30 is moved to an outboard position relative to the tube portion 22 of the seal/scraper ring retainer 20.

Thus with the construction illustrated, as the poppet valve 3 begins to move from the valve closed position shown in FIG. 1 toward the valve open position shown in FIG. 2, the annular bead 30, as then positioned in the tube portion 22, operates as a seal when in the inner wall 22a to substantially protect the valve stem 6 portion above this annular head 30 from the hot exhaust gases and carbon particles contained therein.

As the poppet valve 3 continues to open, the annular bead 30 will also operate so as to scrape off any carbon deposits or burnt ashes thereof that may be on the internal wall 22a of the tube portion 22 from the previous valve operating cycle. Then when the poppet valve 3 is moved to its full open position with the annular bead 30 then being located below the lower end of the tube portion 22, the flow of exhaust gases can then be effective to blow away any carbon deposit particles or ashes thereof which may have been deposited on the valve stem 6 above the annular bead and which had then been scraped off by the scraper ring 21 during the prior valve closing cycle.

However, it should now be apparent from the illustrations in FIGS. 1 and 2, that during most of the movement of the poppet valve 3 from a valve closed position to a valve open position and then back to a valve closed position operating cycle, the annular bead 30 on the poppet valve 3 cooperates with the inner wall 22a of the tube portion 22 extension of the seal/scraper ring retainer 20 to form a gas barrier to substantially prevent the flow of exhaust gases to the valve stem 6 and valve stem guide bore 7 interface at the lower or inboard end of the valve stem guide bore 7 and, of course, with the scraper ring 21 operating both as a valve and as a scraper to scrape off any possible carbon deposits and also acting as a seal the possibility of carbon deposits contaminating any lubricating oil in the valve stem guide bore 7 is substantially reduced, if not totally eliminated.

While the invention has been described with reference to the structure disclosed herein, it is not confined to the specific details set forth, since it is apparent that many modifications and changes can be made by those skilled in the art. For example, the flange 25 of the seal/scraper ring retainer could be formed as a separate element which is then fixed to the seal ring retainer in the position shown for this flange, or the flange 25 could be eliminated so that axial movement of the scraper ring 21 in one direction would be controlled by the shoulder 15 in the cylinder head. This application is therefore intended to cover such modifications or changes as may come within the purposes of the improvements or scope of the following claims.

The embodiments of the invention in which an exclusive property or privilege is claimed are defined as follows:

1. A valve guide seal for an internal combustion engine of the type having a cylinder head with at least one fluid passage therein terminating at a port, flow through which is controlled by a poppet valve having a valve stem reciprocable in the small diameter bore portion of a stepped valve stem guide bore in the cylinder head for movement between a valve closed position and a valve open position relative to said port, said valve guide seal including a seal/scraper ring retainer including at least an enlarged diameter tubular portion fixed in the said stepped valve stem guide bore, a smaller tube portion extension that depends into the fluid passage next adjacent to said port, and a flat shoulder interconnecting said tubular portion to said tube portion extension, a scraper ring operatively positioned in said tubular portion so as to slidably encircle said valve stem, said valve stem having an upstanding annular bead thereon that is of an external diameter so as to be sealingly and slidably received in said tubular portion extension and which is axially located on said valve stem so that said annular bead is moved into said tube portion extension when said valve is in a valve closed position and which moves out of said tube portion extension when said valve is in a valve open position.

2. In combination, an internal combustion cylinder head having at least one fluid passage therein terminating at one end in an annular port encircled by a valve seat, a counterbored stepped valve stem guide bore in said cylinder head defining a valve stem guide bore and an enlarged counterbored inner wall which at one end opens into said fluid passage and at its other end is connected to said valve stem guide bore by a flat shoulder, a tubular seal/scraper ring retainer having an enlarged diameter portion sized to be fixed in said counterbored inner wall and a lower reduced external diameter tubular extension of a predetermined inner diameter extending into said fluid passage, a poppet valve having a head axially movable relative to said valve seat between a valve closed position and a valve open position, said poppet valve further including a valve stem having a free end portion thereof slidably received in said valve stem guide bore and a portion with an upstanding annular bead thereon of an external diameter slidably and sealingly received in said tubular extension when said poppet valve is in said valve closed position, and a scraper ring operatively positioned in said enlarged diameter portion of said seal/scraper ring retainer so as to encircle said free end portion of said valve stem whereby to scrape off any carbon deposits thereon.

* * * * *